(12) United States Patent
Fitzpatrick et al.

(10) Patent No.: US 6,996,389 B2
(45) Date of Patent: Feb. 7, 2006

(54) POWER SUPPLY FOR A SATELLITE RECEIVER

(75) Inventors: John James Fitzpatrick, Indianapolis, IN (US); Suresh Vishwanatm Leley, Indianapolis, IN (US); Andrew Eric Bowyer, Indianapolis, IN (US); John Joseph Curtis, III, Noblesville, IN (US); Robert Alan Pitsch, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/509,970

(22) PCT Filed: Apr. 3, 2003

(86) PCT No.: PCT/US03/10283

§ 371 (c)(1),
(2), (4) Date: Oct. 1, 2004

(87) PCT Pub. No.: WO03/085850

PCT Pub. Date: Oct. 16, 2003

(65) Prior Publication Data

US 2005/0176472 A1 Aug. 11, 2005

Related U.S. Application Data

(60) Provisional application No. 60/381,859, filed on May 20, 2002, provisional application No. 60/370,016, filed on Apr. 3, 2002.

(51) Int. Cl.
*H04B 1/16* (2006.01)
*H04Q 7/20* (2006.01)
*G05F 1/10* (2006.01)

(52) U.S. Cl. .......... 455/343.1; 455/423; 455/572; 455/277.1; 455/289; 323/234; 323/282; 363/74

(58) Field of Classification Search ............ 455/572, 455/573, 343.1, 343.5, 423–425, 13.3, 13.4, 455/8, 127.1, 277.1, 280, 289–292, 117, 12.1; 323/234, 282–285, 204; 363/74, 80, 21.01
See application file for complete search history.

(56) References Cited

U.S. PATENT DOCUMENTS 5,216,434 A * 6/1993 Fukumura .............. 343/876
5,563,500 A 10/1996 Muterspaugh (Continued)

OTHER PUBLICATIONS

Copy of Search Report Dated Jul. 24, 2003.

*Primary Examiner*—Duc M. Nguyen
(74) *Attorney, Agent, or Firm*—Joseph S. Tripoli; Harvey D. Fried; Christine Johnson

(57) ABSTRACT

A power supply for a satellite receiver system includes a dual input supply voltage arrangement. When a higher output voltage is selected, a source of a lower supply input voltage is coupled to an input main current conducting terminal of a series pass transistor. On the other hand, when a lower output voltage is selected, a source of a lower supply input voltage is coupled to the input main current conducting terminal of the series pass transistor. A comparator senses a magnitude of an output voltage produced by the series pass transistor. When, as a result of an over current condition, the output voltage is lower than a reference threshold level, any selection of the higher output voltage is automatically overridden and the source of the lower supply input voltage, instead, is coupled to the input main current conducting terminal of the series pass transistor.

9 Claims, 5 Drawing Sheets

U.S. PATENT DOCUMENTS

| | | |
|---|---|---|
| 5,826,170 A | 10/1998 | Hirschfield et al. |
| 5,828,206 A | 10/1998 | Hosono et al. |
| 6,061,577 A | 5/2000 | Andrieu et al. |
| 6,434,025 B2 * | 8/2002 | Shirai et al. ................ 363/21.1 |
| 6,532,424 B1 * | 3/2003 | Haun et al. ................... 702/58 |
| 6,928,281 B2 * | 8/2005 | Ward et al. ................. 455/423 |

* cited by examiner

POWER SUPPLY FOR A SATELLITE
RECEIVER

CROSS REFERENCE TO RELATED APPLICATIONS

This application claims the benefit, under 35 U.S.C. § 365, of International Application PCT/US03/10283, filed Apr. 3, 2003, which was published in accordance with PCT Article 21(2) on Oct. 16, 2003 in English and which claims the benefit of the filing date of each of Provisional Application Ser. No. 60/370,016, filed Apr. 3, 2002 and of Provisional Application Ser. No. 60/381,859, filed May 20, 2002.

FIELD OF THE INVENTION

The present invention concerns a protection arrangement for a voltage regulator.

A block diagram of a typical satellite receiver system is depicted in FIG. 1. The receiver system includes an outdoor microwave antenna 85 which can be aimed at a satellite to receive a signal from a satellite. The signal received from the satellite is amplified by a conventional low noise block converter (ILNB) 86 mounted in very close proximity to or on the antenna LNB 86 down-converts satellite signals at high frequencies, typically in the gigahertz range, to signals at frequencies in the high megahertz range. An output signal from LNB 86 is carried to an indoor satellite receiver and decoder system 83 by a coaxial cable 84, decoded and presented with a monitor device 81.

In order to supply power to LNB 86, as well as to control the polarization selection of LNB 86, a direct current (DC) output supply voltage $V_O$, produced in a power supply, not shown, but included in satellite receiver and decoder system 83, is multiplexed onto the center conductor of coaxial cable 84. Voltage $V_O$ has a level that is, selectively, either 13V or 18V. The power supply, not shown, may include a series pass transistor. An example of a prior art power supply that generates output supply voltage similar to voltage $V_O$ is described in U.S. Pat. No. 5,563,500, entitled, VOLTAGE REGULATOR HAVING COMPLEMENTARY TYPE TRANSISTOR in the name of Muterspaugh (the Muterspaugh Patent).

The lower and higher output supply levels of voltage $V_O$ are used, selectively, to control polarization settings of LNB 86. For example, the lower voltage level 13V selects right hand circular polarization (RHCP) and the higher voltage 18V selects left hand circular polarization (LHCP).

The circuits in LNB 86 of FIG. 1 are designed to function properly when energized at either the lower output supply level 13V and the higher output supply level at 18V. A current drain IO of LNB 86 is about the same with either of the 13V level or the 18V level.

FIG. 2 illustrates a typical relationship between output supply voltage $V_O$ and output current IO of the power supply, not shown, of the satellite receiver system of FIG. 1. The maximum power dissipation in the series pass transistor will occur when the voltage difference between the input and output main current conducting terminals of the series pass transistor, not shown, is at the maximum and the output current is at the maximum. This condition will occur at the 6 volt level of FIG. 2.

With the need to supply three or more satellite antenna devices from a single satellite receiver, the power requirements of the satellite antenna supply are increased. This increase in power driving capability results in a greater power loss (in the form of heat) when a fault condition is present in the power supply. There is a need to minimize the heat generated in the controllable series pass transistor during a fault condition. The controllable series pass transistor may be damaged if a short circuit or other fault is formed at the output terminal of the series pass transistor. A fault condition may be a result of, for example, improper wiring the output of the receiving instrument. Examples of improper wiring include driving a nail through the coax cable and connecting of the satellite receiver to a conventional roof antenna instead of the satellite dish. Such damage often is caused by excessive thermal dissipation of the series pass transistor or by exceeding the current rating of the series pass transistor. For this reason, it is common to provide overload protection to prevent such damage to the series pass transistor.

Another prior art includes a dual input supply voltage of arrangement. When the higher output voltage 18V is selected, a higher input supply voltage of 22 volts is developed at an input, main current conducting terminal of the series pass transistor, not shown. On the other hand, when the lower output voltage of 13 volts is selected, a lower input supply voltage at 16 volts is developed at the input main current conducting terminal of the series pass transistor, not shown. Thereby, the power dissipation in the power series pass transistor, not shown, when the lower output voltage of 13 volts is selected, is, advantageously, reduced.

A power supply, embodying an inventive feature, includes the aforementioned dual input supply voltage arrangement. A comparator senses a magnitude of an output voltage produced by the series pass transistor. When, as a result of an over current condition, the output voltage becomes lower than a reference threshold level, any attempt to select the higher output voltage of 18V is automatically over-ridden and the lower input supply voltage, instead, is developed at the input main current conducting terminal of the series pass transistor, not shown. This action, advantageously, decreases the maximum amount of power that the series pass transistor dissipates.

SUMMARY OF THE INVENTION

A power supply for a communication apparatus, embodying an aspect of the invention includes, a source of a first control signal that is indicative when a first antenna signal is to be selected and when a second antenna signal is to be selected. A power transistor is responsive to the first control signal for generating an output supply voltage at a value selected in accordance with the first control signal. The output supply voltage is coupled to a stage of the communication apparatus to select the first antenna signal, when a first value of the output supply voltage is generated and the second antenna signal, when a second value of said output supply voltage is generated. A switch is responsive to the first control signal and coupled to an input of the power transistor for selecting, in a first switching state of the switch, a first input supply voltage to be developed at the input, when the first antenna signal is selected. In a second switching state of the switch, a second input supply voltage is selected to be developed at the input, when the second antenna signal is selected. A fault detector is coupled to the switch for changing the switching state in the switch, when the second antenna signal is selected and a fault condition occurs, to select an input supply voltage to be developed at the input that is different from the second input supply voltage.

DETAILED DESCRIPTION OF THE PREFERRED EMBODIMENTS

Figure 1:
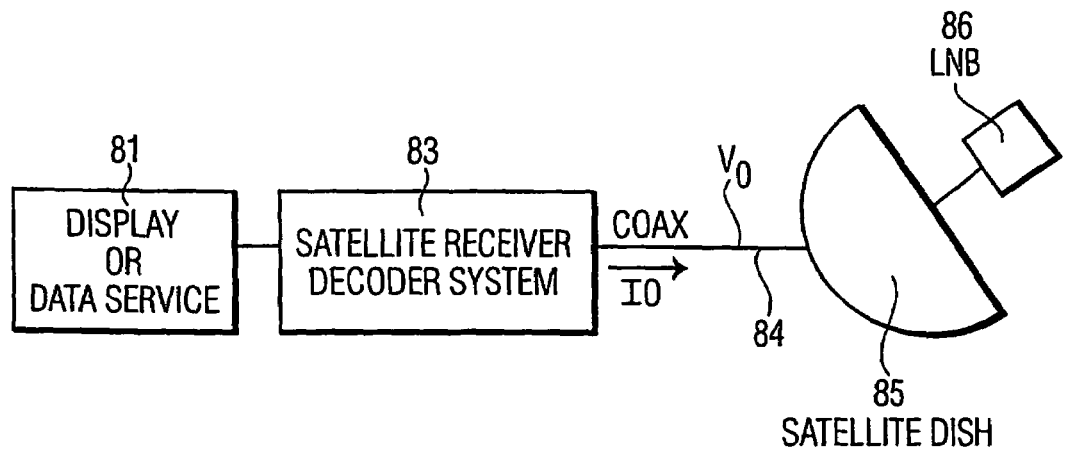
FIG. 1 illustrates a typical satellite receiver system.
Figure 3:
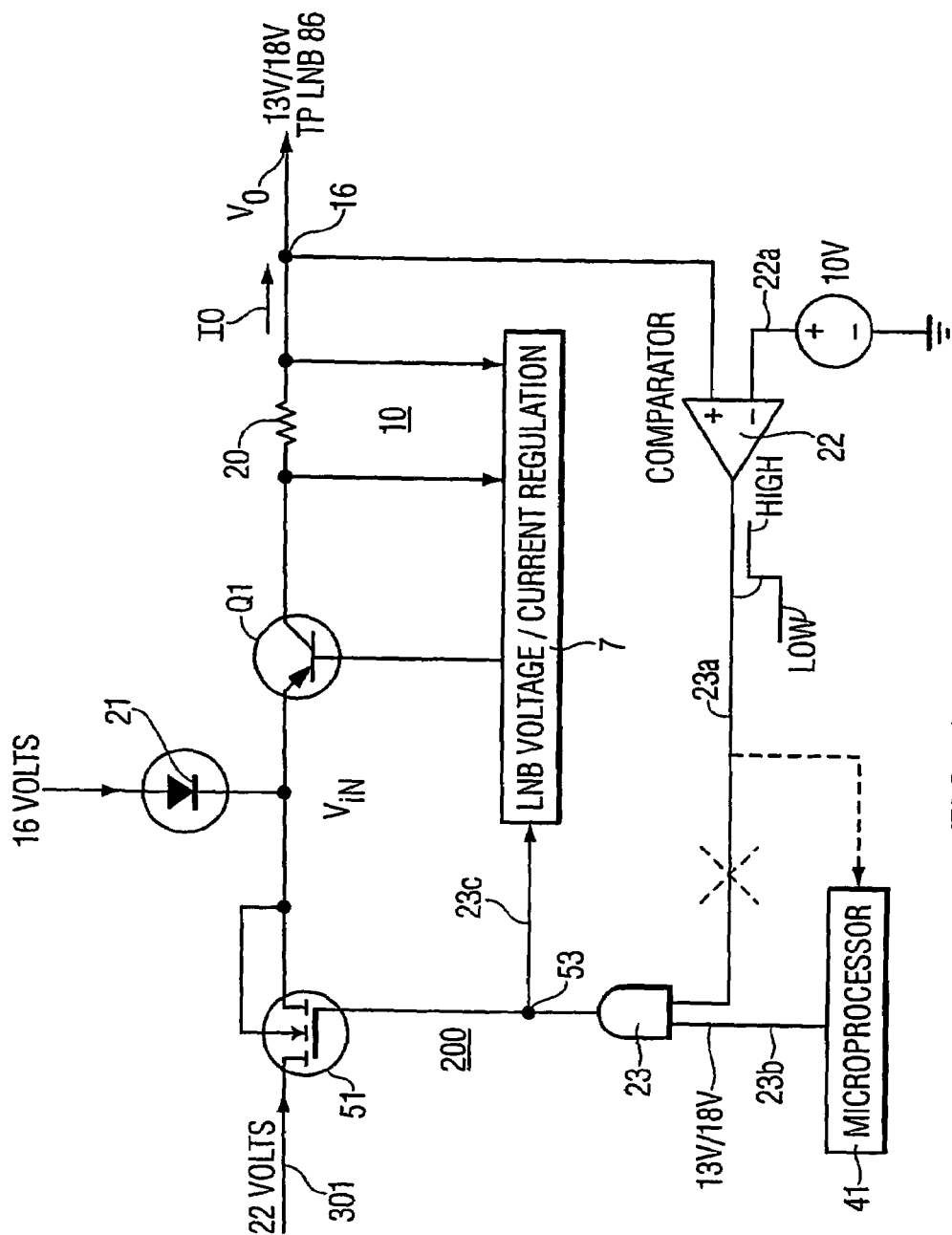
FIG. 3 illustrates a power supply regulator, embodying an inventive feature, which can be incorporated in the satellite receiver system of FIG. 1.

FIG. 3 illustrates a power supply regulator 10, embodying an inventive feature, is used to energize a low noise block converter (LNB) 86 of FIG. 1. Power supply regulator 10 of FIG. 3 provides regulated output voltage $V_O$ at an output terminal 16. Terminal 16 is coupled to LNB 86 via coax cable 84 of FIG. 1. An emitter of a series pass power transistor Q1 of FIG. 3 is supplied with an input voltage $V_{IN}$ higher than regulated output voltage $V_O$, developed at terminal 16. A collector of transistor Q1 is coupled via a current sensing resistor 20 to terminal 16.

An LNB voltage control circuit 7 senses output voltage $V_o$ and controls power transistor Q1 for regulating output voltage $V_O$. A level of output voltage $V_O$ is selected by a bi-level or binary control signal 23c at a control terminal 53.

In the absence of a fault condition, the steady state level of output voltage $V_O$ is greater than, for example, 10V. Therefore, a comparator 22, embodying an inventive feature, having a corresponding reference voltage 22a, produces an output signal 23a at a TRUE state. Reference voltage 22a establishes the threshold level of comparator 22. Consequently, a signal 23c produced by an AND gate 23 is at the same state as that of an output signal 23b produced by a microprocessor 41. Thus, signal 23c can selectively assume either a TRUE state, for selecting output voltage $V_O$ at 18V, or a FALSE state, for selecting output voltage $V_O$ at 13V, in accordance with signal 23b of microprocessor 41. For example, the lower voltage level 13V of output voltage $V_O$ selects right hand circular polarization (RHCP) and the higher voltage 18V of output voltage $V_O$ selects left hand circular polarization (LHCP). Thereby, the antenna signal produced by antenna 85 of FIG. 1 varies. Thus, the regulation in power supply regulator 10 of FIG. 3 is performed similarly to that described in the Muterspaugh Patent.

FIG. 3 also illustrates a dual input supply voltage arrangement 200 for generating input voltage $V_{IN}$ that energizes LNB power supply regulator 10. When the higher output level of voltage $V_O$ at 18 volts is selected, a metal oxide semiconductor field effect transistor (MOSFET) 51, operating as a switch, is turned on by signal 23c to supply input voltage $V_{IN}$ at 22 volts to the emitter of transistor Q1 from an input supply voltage 301. On the other hand, when the lower level of output voltage $V_O$ at 13 volts is selected, MOSFET 51 is turned off by signal 23c. Consequently, input voltage $V_{IN}$ at approximately 16 volts is supplied to the emitter of input voltage $V_{IN}$ via an anode terminal of diode 21 transistor Q1 via a diode 21. Thus, diode 21 and MOSFET 51 form an input voltage selection switch for a dual voltage power supply.

In normal operation, power supply regulator 10 generates output voltage $V_O$ at the 18 volt level from input voltage $V_{IN}$ at approximately 22 volts. Similarly, power supply regulator 10 generates output voltage $V_O$ at the 13 volt level from input voltage $V_{IN}$ at approximately 16 volts.

Figure 2:
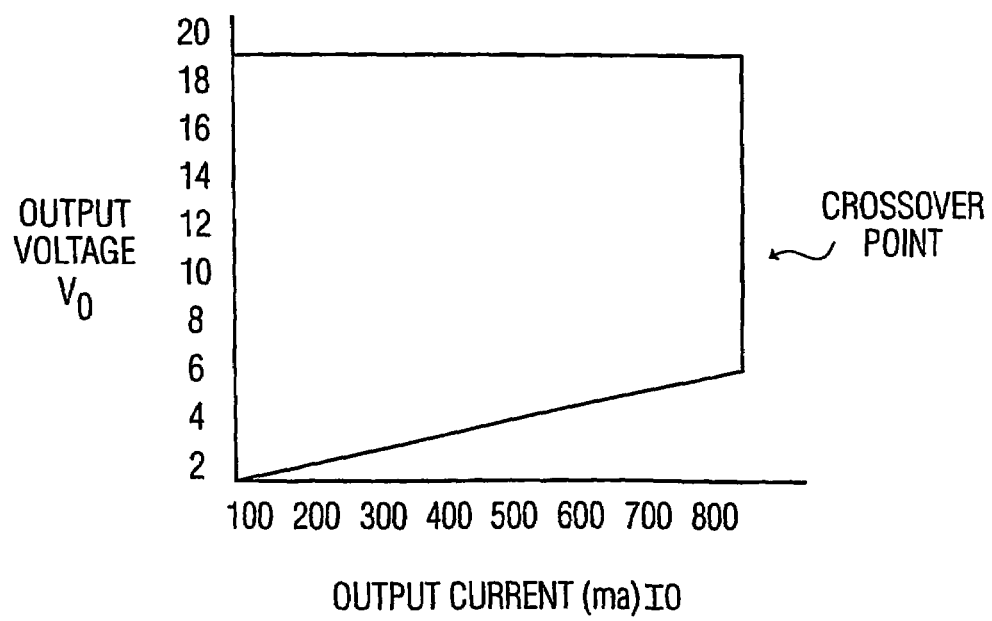
FIG. 2 illustrates a typical relationship between an output supply voltage and output supply current of a power supply of the satellite receiver system of FIG. 1.

An LNB, similar to LNB 86 of FIG. 1, includes an internal power supply regulator, not shown, for generating an internal supply voltage of 5V, not shown, from voltage $V_O$ at either the 13V level or the 18V level. The internal power supply regulator, not shown, requires a minimum input supply voltage of 6V for producing the 5V level that is capable of providing the maximum required LNB operation current. Thus, a maximum LNB operation current can be produced when voltage $V_O$ at at least 6 volts level is applied to LNB 86. In order to assure proper power up operation, power supply regulator 10 of FIG. 3 is designed to supply a maximum current level of an output current $I_o$ when output supply voltage $V_O$ is equal to or greater than 6 volt. The relationship between output supply voltage $V_O$ and an output current L1 are shown in FIG. 2, as explained before.

In normal operation (non current limit), the voltage drop between the emitter and collector of power transistor Q1 is within a normal, safe level. A fault condition occurs when, for example, an impedance that is too low is connected to output terminal 16. Consequently, power supply current $I_o$ reduces voltage $V_O$ to the 6 to 10 volt output level at terminal 16, because of current limiting, as shown at the 6 volt level of FIG. 2.

The maximum power dissipation in transistor Q1 of FIG. 3 occurs when voltage $V_O$ is equal to 6V and output current $I_o$ is at the current limit level. If not prevented from doing so, the decrease in output voltage $V_O$ would cause the voltage drop develop between the emitter and collector of power transistor Q1 to become excessive when input voltage $V_{IN}$ at 22 volts is coupled to the emitter of transistor Q1. The additional heat generated in such fault condition could prematurely produce a permanent damage to power transistor Q1.

Figure 4:
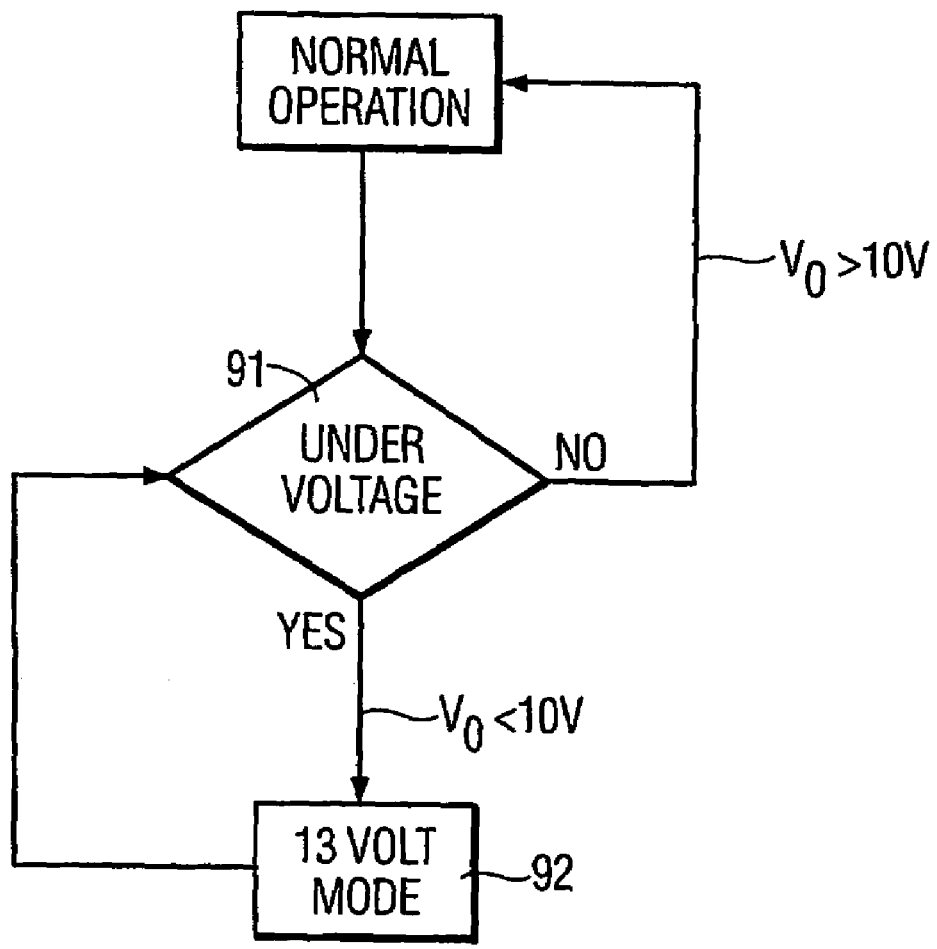
FIG. 4 illustrates a flow chart for describing a mode of operation the power supply regulator of FIG. 3 providing protection by a hardware technique.

In carrying out an inventive feature, when voltage $V_O$ is lower than a threshold level of approximately 10V, as depicted in a step 91 of the flow chart of FIG. 4, output signal 23a of comparator 22 of FIG. 3 is at a LOW state. When output signal 23a comparator 22 is at the LOW state, it over-rides, by the operation of AND gate 23, the operation of selection signal 23b. Thereby, power supply regulator 10 is forced to operate in a 13V mode in which output voltage $V_O$ is 13V, as depicted in a step 92 of the flow chart of FIG. 4, regardless of selection signal 23b produced by microprocessor 41.

As explained before, when the lower level of 13 volts of output voltage $V_O$ is selected, MOSFET 51, is turned off by signal 23b to supply, via diode 21, input voltage $V_{IN}$ at approximately 16 volts at the emitter of power transistor Q1. This action, advantageously, decreases the amount of power that power transistor Q1 needs to dissipate. The threshold level established by voltage 22a is preferably selected to be lower than the lower voltage level 13V of output voltage $V_O$, and higher than 6 volts.

Figure 5:
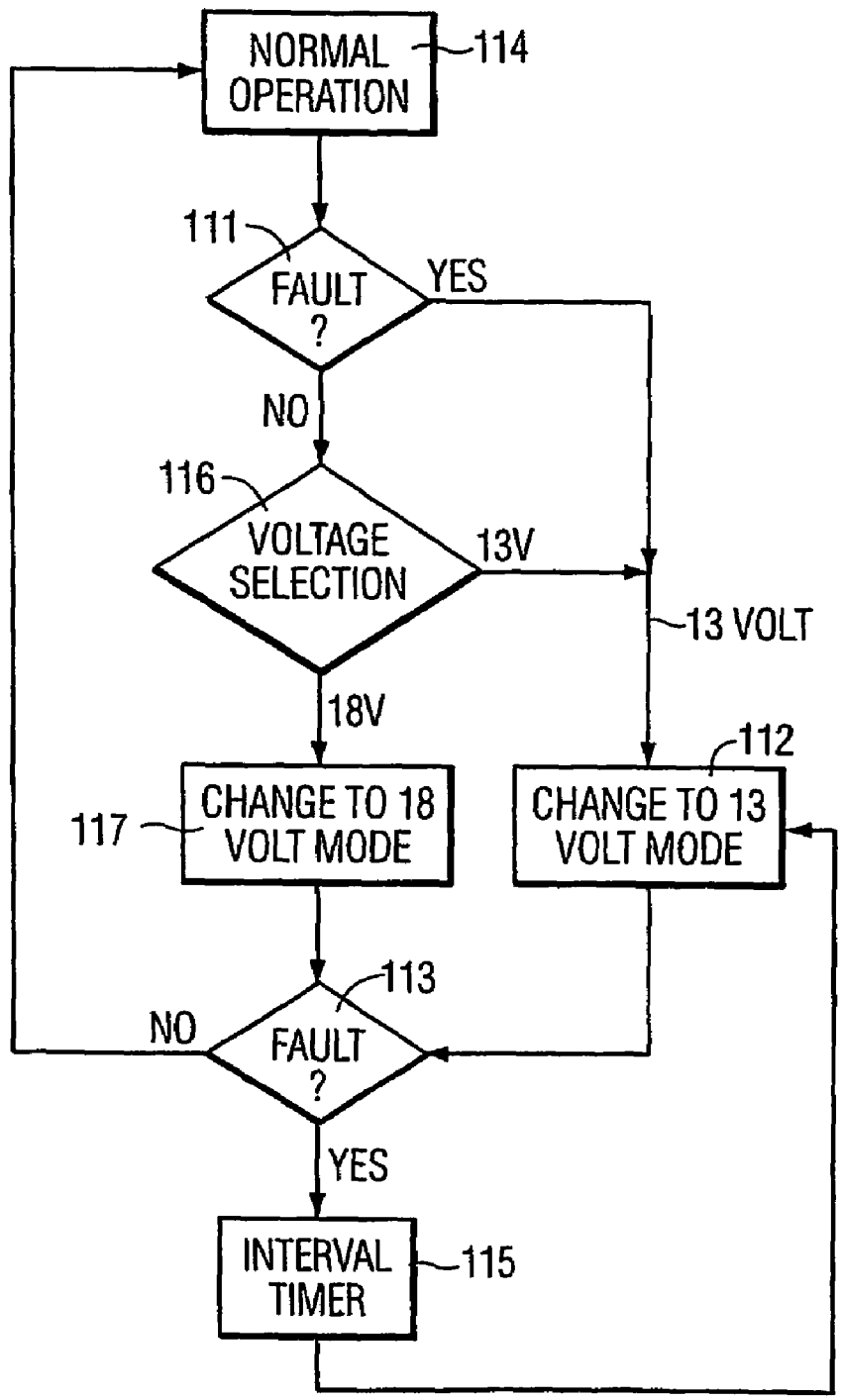
FIG. 5 illustrates a flow chart for describing a mode of operation the power supply regulator of FIG. 3 providing protection by a combination of software and hardware techniques.

Instead of using AND gate 23 for over-riding the selection, software protection can be used, as depicted in the flow chart of FIG. 5. In such an alternative arrangement, signal 23a of FIG. 3 is coupled to microprocessor 41, as shown by the broken line. Signal 23b of microprocessor 41 is passed to terminal 53. Microprocessor 41 monitors signal 23a. When output signal 23a of comparator 22 is at the LOW state, indicating a fault condition, as determined in step 111 of FIG. 5, microprocessor 41 of FIG. 3 unconditionally generates signal 23b at the LOW state. Therefore, power supply regulator 10 is forced to operate in the 13 volt mode, in a manner described before, as depicted in step 112 of FIG. 5. When the fault condition disappears, as depicted in step 113 of FIG. 5, normal operation step 114 can resume. On the other hand, if the fault persists, an interval timer step 115 will maintain the 13 volt mode. If fault is not detected in step 111, microprocessor 41 of FIG. 3 selectively generates signal 23b at the LOW state or at the HIGH state in a step 116. Signal 23b of FIG. 3 at the HIGH state will cause power supply regulator 10 to operate in the 18 volt mode in which output voltage $V_O$ is 18V, in a manner described before, as depicted in step 117 of FIG. 5.

Figure 6:
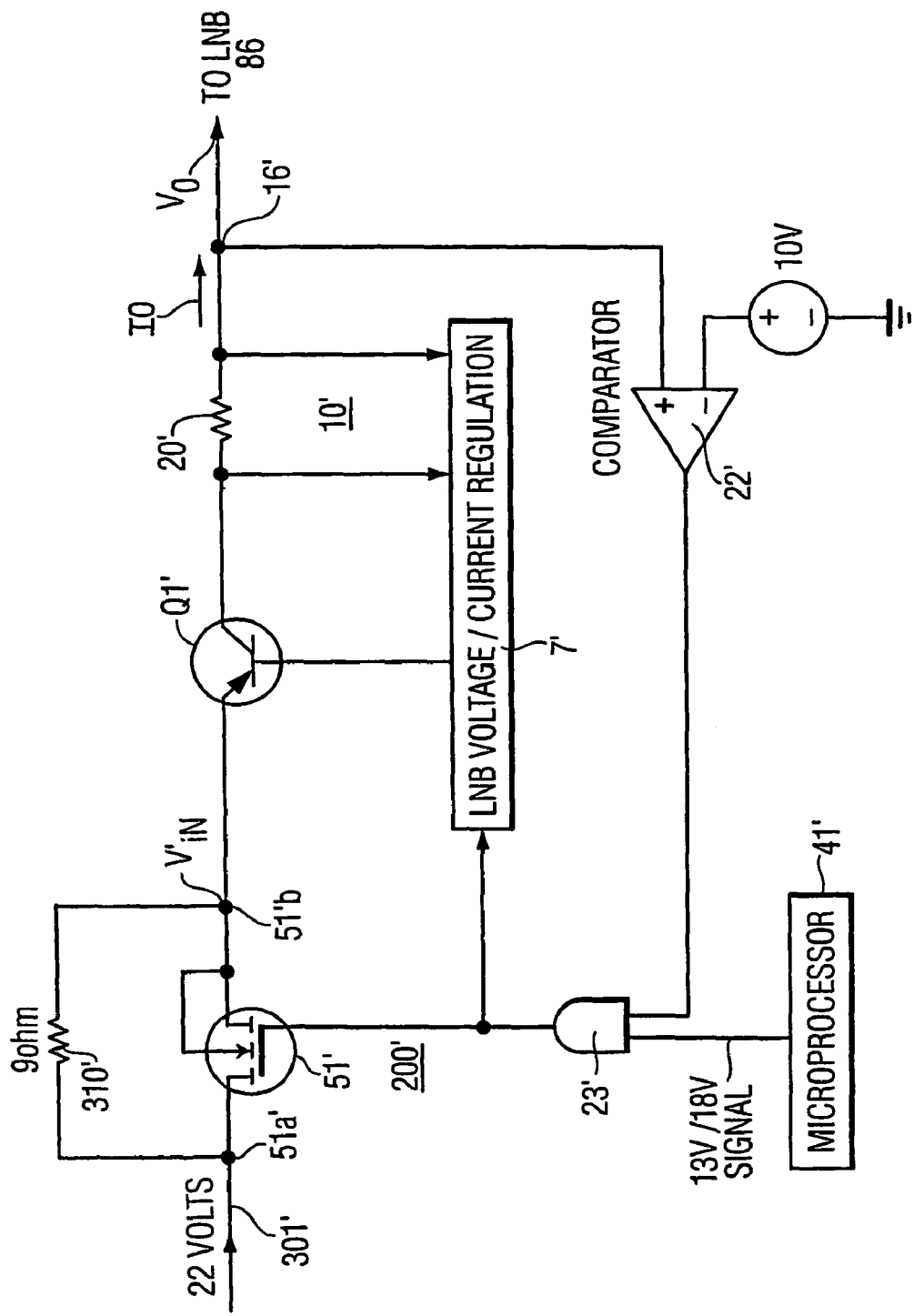
FIG. 6 illustrates an alternative embodiment of the power supply regulator shown in FIG. 3.

FIG. 6 illustrates a power supply regulator 10', embodying an inventive feature, that is used to energize LNB 86 of FIG. 1. Similar symbols in FIGS. 3 and 6 indicate similar items or functions.

Power supply regulator 10' of FIG. 6 is intended to provide additional advantages, for example operating with fewer parts at a lower cost and protecting power transistor Q1' against thermal damage from excess heat dissipation. These advantages are achieved by eliminating the dual input supply voltage and, instead, switching a power resistor 310' into and out of a series coupling with power transistor Q1'. Resistor 310' is coupled between a main current conducting terminal 51a' and a main current conducting terminal 51b'. The differences between the arrangements of FIGS. 3 and 6 will be described in detail; the remaining operation being substantially the same.

In order to save cost, a single input supply voltage 301' is provided, namely the 22 volt supply. Power resistor 310' is used to absorb the additional heat generated in the lower 13 volt mode, when the lower level of 13 volts of output voltage $V_O$ is selected. Power resistor 310' can be implemented, for example, by using two resistors coupled across the main current conducting terminals 51a' and 51b' of MOSFFE 51' and having an equivalent value of 9 Ohm. As explained before, circuit 10 of FIG. 3 employs diode 21 and MOSFET 51 to switch voltage $V_{IN}$ to the 16 volt level, in a fault condition and when the lower level of 13 volts of output voltage $V_O$ is selected. Whereas, in the embodiment of FIG. 6, MOSFET 51' causes power resistor 310' to be coupled in series with transistor Q1', both in a fault condition and when the lower level of 13 volts of output voltage $V_O$ is selected.

When the LNB supply is in the 13 volt mode, that is when the lower level of 13 volts of output voltage $V_O$ is selected, and a high current level is demanded from the supply, substantial heat is dissipated by power transistor Q1'. This heat dissipation burden is advantageously shared by power resistor 310'. Whether power resistor 310' is in or out of the circuit depends on MOSFET 51' being on or off.

What is claimed is:

1. A power supply for a communication apparatus, comprising:
a source of a first control signal that is indicative when a first antenna signal is to be selected and when a second antenna signal is to be selected;
a power transistor responsive to said first control signal for generating an output supply voltage at a value selected, in accordance with said first control signal, said output supply voltage being coupled to a stage of said communication apparatus to select said first antenna signal, when a first value of said output supply voltage is generated and said second antenna signal, when a second value of said output supply voltage is generated;
a switch responsive to said first control signal and coupled to an input of said power transistor for selecting, in a first switching state of said switch, a first input supply voltage to be developed at said input, when said first antenna signal is selected, and, in a second switching state of said switch, a second input supply voltage to be developed at said input, when said second antenna signal is selected; and
a fault detector coupled to said switch for changing the switching state in said switch, when said second antenna signal is selected and a fault condition occurs, to select an input supply voltage to be developed at said input that is different from said second input supply voltage.

2. The power supply according to claim 1, wherein said output supply voltage is developed at a first main current conductive terminal of said power transistor and each of said first and second input supply voltages is selectively developed at a second main current conductive terminal of said power transistor to form a series pass regulator.

3. The power supply according to claim 2 wherein, in normal operation, when said first antenna signal is selected, a smaller magnitude of said output supply voltage is generated and said first input supply voltage having a smaller magnitude than said second input supply voltage is selected to be developed at said input of said power transistor in a manner to reduce a voltage difference between said first and second main current conductive terminals of said power transistor.

4. The power supply according to claim 2 wherein, in normal operation, when said second antenna signal is selected, a larger magnitude of said output supply voltage is generated and said second input supply voltage having a larger magnitude than said first input supply voltage is selected to be developed at said input of said power transistor and wherein, when said fault condition occurs, said first input supply voltage is selected instead of said second input supply voltage to be developed at said second main current conductive terminal of said power transistor to reduce a voltage difference between said first and second main current conductive terminals of said power transistor.

5. The power supply according to claim 2, further comprising a regulator coupled to said power transistor for regulating said output supply voltage in a negative feedback manner.

6. The power supply according to claim 1 wherein said fault detector comprises a comparator responsive to said output supply voltage for generating a second control signal that is coupled to said switch to change the switching state in said switch, when said output supply voltage is outside a normal operation range of values.

7. The power supply according to claim 6 wherein each of said first and second control signals is coupled to said switch via a stage performing a logic function.

8. The power supply according to claim 6 wherein said first control signal is generated in a microprocessor that is responsive to said second control signal.

9. The power supply according to claim 1 wherein said switch comprises a second transistor, wherein a power resistor is coupled between a pair of main current conductive terminals of said second transistor and wherein, when said second transistor is at a conductive switching state, said resistor is bypassed and a voltage that is developed at said input is higher than when said second transistor is at a non-conductive switching state and said resistor dissipates power.

* * * * *